United States Patent [19]
Johnson, III

[11] 3,935,520
[45] Jan. 27, 1976

[54] DC MOTOR REGULATOR

[75] Inventor: Chandler A. Johnson, III, Erie, Pa.

[73] Assignee: General Electric Company, Erie, Pa.

[22] Filed: July 24, 1974

[21] Appl. No.: 491,604

[52] U.S. Cl.............................. 318/332; 318/326
[51] Int. Cl.² ....................................... H02P 5/16
[58] Field of Search............... 318/326, 327, 332

[56] References Cited
UNITED STATES PATENTS

| | | | |
|---|---|---|---|
| 3,284,688 | 11/1966 | Black | 318/332 |
| 3,295,040 | 12/1966 | Schieman | 318/332 X |
| 3,413,534 | 11/1968 | Stringer | 318/332 X |
| 3,526,819 | 9/1970 | Graf | 318/332 X |
| 3,586,949 | 6/1971 | Spear et al. | 318/332 X |
| 3,775,653 | 11/1973 | Peterson et al. | 318/332 X |

Primary Examiner—Gene Z. Rubinson
Attorney, Agent, or Firm—Arnold E. Renner

[57] ABSTRACT

A regulator for a direct current motor including both current limit and speed feedback paths further includes a speed control circuit for controlling a controllable power supply the output of which governs motor speed. The speed control circuit is designed to provide a desired transfer characteristic having extremely high gain at low frequencies while maintaining a substantially unity gain at higher frequencies to thereby enhance the stability of the motor operation throughout a wide range.

8 Claims, 3 Drawing Figures

DC MOTOR REGULATOR

BACKGROUND OF THE INVENTION

The present invention relates generally to direct current (d.c.) motor regulators and more specifically to regulators having current and speed feedback loops for the regulation of motor operation.

In the field of motor regulation it is well known to provide both speed control and current limit; that is, regulation in which the speed of the motor will be maintained at a desired value until such time as the motor reaches a point at which the current exceeds a prescribed limit. When the current limit is reached, another portion of the regulator will become effective to prevent the motor current from further increase. The theoretically perfect speed/current curve achieved by a motor is one in which the speed remains absolutely constant until such time as the current limit is reached at which time there is no further increase in speed and the current will remain constant even though the speed may decrease to zero. As a practical matter, such a perfect curve is never achieved partially because of imperfections in equipment and components and partially because there is normally some form of interaction between the current limiting and speed control portions of the regulator.

It is also recognized by those skilled in the art that a closely regulated d.c. motor, as will be more fully described in the detailed specification which follows, can become unstable when rapid regulation changes are required. This is because certain of the circuit components used in the control are inherently frequency responsive and the motorload itself, when viewed as a system, is also responsive to frequency.

Numerous schemes for speed control to achieve both adequate regulation and stability have been devised. These schemes are generally complex and if designed to be useful over a range of motors have required a plurality of adjustments due largely to the fact that the frequency responsive elements including the motor system itself do exist. For these reasons it is generally desirable to provide a relatively high gain at low frequencies and a low gain at high frequencies.

SUMMARY OF THE INVENTION

It is, therefore, an object of the present invention to provide an improved regulator for a direct current motor.

It is a further object to provide a direct current motor regulator providing extremely high gain in response to low frequencies and substantially a uniform unity gain at higher frequencies.

It is a still further object to provide a direct current motor regulator which is readily adjustable over a wide operational range.

It is another object to provide a direct current motor regulator employing both current and speed feedback regulation loops in which the two forms of regulation are substantially independent of one another.

It is still another object to provide a direct current motor regulator which is readily adaptable and applicable to a large range of different motors and drive systems.

In accordance with the present invention, a regulator for a direct current motor provides the control signal which governs the output of a controllable power source in response to feedback signals from both a current limiting circuit and a speed control circuit. The current limiting circuit is effective only after the reaching of a particular value of motor current and until that point is reached the speed control circuit is solely effective. The speed control circuit is of a nature to provide a specified transfer characteristic resulting in an extremely high gain in response to low frequency signals and a gain which remains substantially constant and preferably at unity for higher frequency signals. In accordance with the present invention the two regulation circuits or loops are interconnected such that upon the occurrence of the current limit circuit sole control is given to that circuit in preference over the speed control signal.

DESCRIPTION OF THE DRAWINGS

The foregoing and other objects of the present invention will become apparent as the following description proceeds and the features of novelty which characterize the invention will be pointed out in particularity in the claims annexed to and forming a part of this specification. For a better understanding of the invention, reference is made to the accompanying drawings in which:

DETAILED DESCRIPTION

Figure 1:
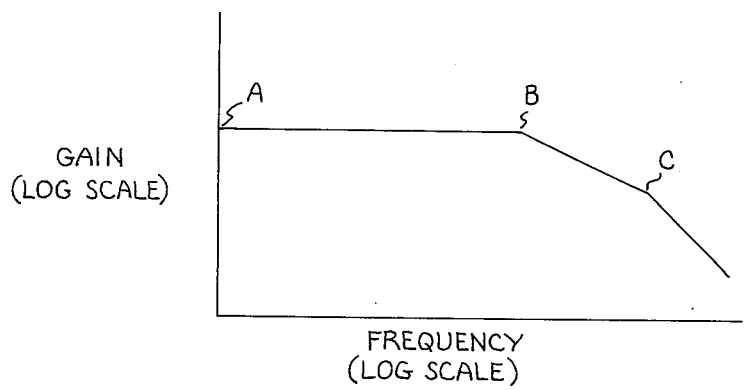
FIG. 1 is a Bode diagram of the transfer characteristic of a typical d.c. motor-load system.

Before beginning a detailed description of the present invention it is believed well to discuss briefly the transfer characteristic of a typical motor-load system which makes the present invention desirable. FIG. 1 is a Bode diagram showing the plot on logarithmic scales of gain (ordinate) versus frequency (abscissa). In this case, gain may be considered as the ratio of the motor input voltage to the motor speed. In FIG. 1 three points A, B and C are designated. As illustrated, the curve between points A and B shows no slope indicating that in this range the motor speed will closely follow the voltage input; that is, any change in the voltage input will result in a proportional change in motor speed. As the frequency increases, a first downbreak (point B) occurs primarily as a result of inertial effects of the motor-load system. The portion of the curve between points B and C indicates that there will now be a time lag between the application of a change in input voltage and a resultant change in the motor speed. At point C, a second downbreak exists which is cumulative with the first and results in a rather steep slope in the curve. The second downbreak is basically the result of the reactance of the motor windings themselves.

Normal motor control systems employ a speed feedback which is in opposition to a designated reference to provide stability; that is, the adjustment of the system is such that when the motor is operating at precisely the desired speed, the feedback signal and the reference speed signal are equal and there is no error signal. With this in mind, it is apparent from FIG. 1 that a large gain in the speed control loop is desirable so that a small deviation in motor speed will result in a very rapid correction to maintain the correct motor speed. However, it is also seen from FIG. 1, particularly after point C where the double downbreak has occurred, that it is possible to develop what amounts to a 180 degree phase shift in the feedback signal with respect to the applied input voltage. If such were the case, the feedback signal, instead of opposing the desired reference signal would in fact be additive thereto, compounding the error and making the total system unstable. It is, therefore, highly desirable that the gain of the system be low at this point so as to minimize this potential instability.

Figure 2:
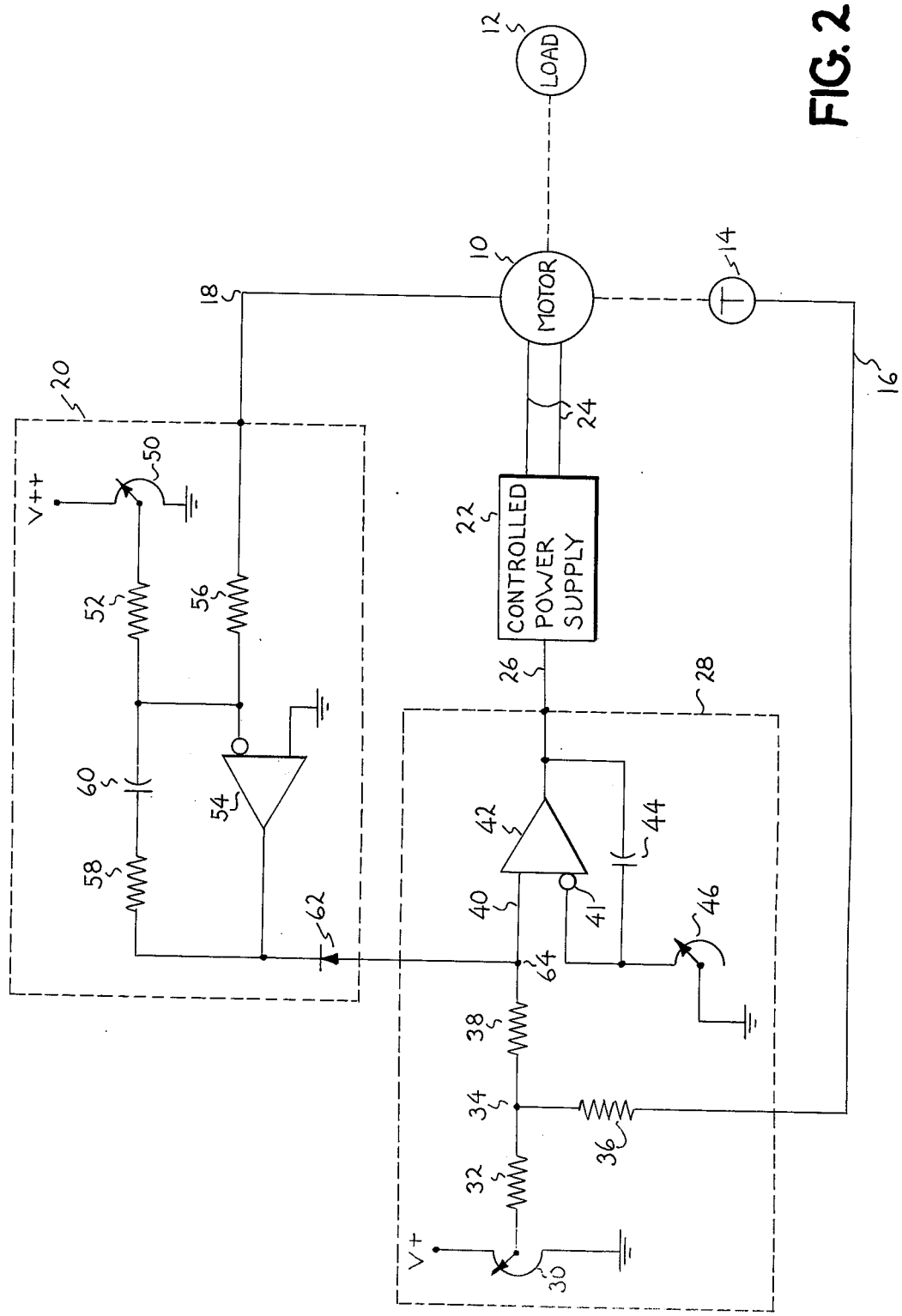
FIG. 2 is a schematic diagram of the preferred embodiment of the present invention.

Reference is now made to FIG. 2 which shows the present invention in its preferred embodiment. As shown in FIG. 2 there is provided a motor 10 connected to a suitable load 12 as indicated by the dotted line. A suitable means for providing a feedback signal which is proportional to the motor speed is indicated as a tachometer 14 driven by the motor as is indicated by the dotted line connecting those two elements. Tachometer 14 provides an output signal on line 16 which is proportional to the motor speed. It will, of course, be obvious to those skilled in the art that the tachometer 14 is merely exemplary and that other devices or methods could be employed. For example, the motor armature voltage could, in certain instances, be sufficiently accurate and indicative of motor speed to permit its use as a feedback signal. A second feedback signal is provided from the motor 10 on line 18. This signal is one which is proportional to motor current and is one which can be derived in the manner well known in the art. The signal on line 18 is provided as an input to a current limit circuit shown within the dotted line block 20 which will be further described later in this specification.

Power is supplied to the motor 10 from a controlled power supply 22 by way of conductors illustrated at 24. As is well known in the art, the speed of a separately excited direct current motor is primarily the function of its input voltage. The function of the controlled power supply 22, therefore, is to vary the voltage applied to conductors 24 in response to an input control signal applied to the controlled power supply by way of an input on line 26. The signal on line 26 is the output of a speed control circuit shown within the dotted line block 28. The actual nature of the controlled power supply is not material to the present invention and may be any of those well known in the art. The power supply 22 may, for example, employ controlled rectifier devices which vary the percentage of total time that a d.c. source (not shown) is connected to the motor in response to the input control signal. As another example, assuming an a.c. source were used, the controlled power supply could employ a controlled rectifier bridge in which the rectifiers are phase controlled to vary the d.c. output all in a manner well known in the art. The basic criteria in this instance being that the power supply is adjustable in accordance with an input control signal.

The speed control circuit shown within the dotted line block 28 includes a means for providing a suitable reference voltage which is proportional to the desired motor speed. This reference voltage is shown as being achieved by a potentiometer 30 connected between a suitable reference voltage (V+) and ground. The wiper arm of the potentiometer is connected through a scaling resistor 32 to a junction 34. The speed feedback signal on line 16 is also applied to the junction 34 through a suitable scaling resistor 36. The values of the several components are chosen such that when the motor is operating at the desired speed the voltage from the potentiometer 30 and that appearing on line 16 are equal in magnitude and opposite in polarity such that a zero voltage appears at junction 34. Any voltage existing at junction 34 is applied via a resistor 38 and a line 40 to the normal input of an operational amplifier 42. A feedback path from the output of the amplifier 42 to the inverting input 41 thereof comprises a capacitor 44 so that under prescribed circumstances an integration function will be performed. However, there is also provided a second potentiometer 46 which is connected between a point of fixed potential (shown as ground) and the inverting input of the amplifier 42 as will be more fully explained. As can be shown, the portion of the circuit consisting of the amplifier 42, capacitor 44 and the variable resistor 46 form a unique circuit having a transfer characteristic defined by the equation $$G = \frac{1 + R \cdot C \cdot j\omega}{R \cdot C \cdot j\omega j\omega};$$

wherein $G$ is the ratio of the output voltage of the amplifier 42 as seen on line 26 to the input voltage as seen on line 40, $R$ equals the resistance of the resistor 46, $C$ is the capacitance of capacitor 44 and $j\omega$ equals $j2\pi f$.

The current limit circuit within block 20, which receives the motor current signal via line 18, includes a means for establishing a suitable reference signal illustrated as a potentiometer 50 connected between a suitable source of voltage (V++) and ground. The wiper arm of the potentiometer 50 is connected through a scaling resistor 52 to the inverting input of an operational amplifier 54 which input also receives the motor current signal on line 18 via a scaling resistor 56. The normal input of the operational amplifier 54 may be connected to ground. A feedback path including a resistor 58 and a capacitor 60 is provided between the output of the amplifier 54 and its inverting input to perform an integration function as is well known in the art. The output of the amplifier 54 is applied to a junction 64 which exists between resistor 38 and the normal input of operational amplifier 42 of the speed control circuit 28 by way of a diode 62 which is poled to conduct in a direction toward the amplifier 54.

The operation of the invention as shown in FIG. 2 is as follows. First assume that the motor is not in current limit resulting in a positive output from amplifier 54. Diode 62 is thus back-biased and no current can flow in resistor 38. In this situation, the voltage at the normal input to the operational amplifier 42 as seen on line 40 will be equal to the voltage appearing at junction 34. The voltage at 34 representing the error in speed will, of course, be the difference between the reference voltage from potentiometer 30 and the feedback voltage via line 16. As such, the output of the operational amplifier 42 as seen on line 26 will follow in direct response to the inputs on line 40 and that to the inverting terminal of that amplifier so as to force the voltage at the inverting input 41 to be equal to voltage on line 40. Assuming the motor is not running at speed corresponding to that desired by the setting and that the voltage appearing on line 40 is some non-zero value, then a current will flow in the rheostat 46 equal to the voltage at terminal 41 divided by the effective value R of the potentiometer 46. This current is provided from the output as seen on line 26 through the capacitor 44 and is equal to the difference between the value of the voltage at 26 and that at the terminal 41 divided by $1/(C \cdot j\omega)$. Thus, as was previously explained, the gain of this portion of the circuit G is equal to $$\frac{1+R \cdot C \cdot j\omega}{R \cdot C \cdot j\omega}$$

The voltage on line 26 will be applied to the controlled power supply 22 resulting in the change in the voltage applied to the motor to effect a corresponding change in the speed of the motor with a subsequent reduction in the error voltage which appears at the junction 34.

Figure 3:
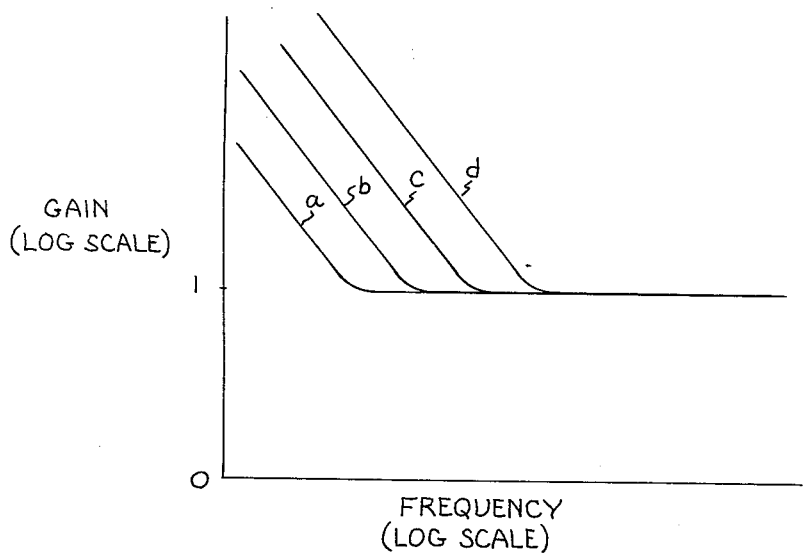
FIG. 3 is a Bode diagram showing the transfer characteristic of the speed control of the system of the present invention.

FIG. 3 illustrates a Bode diagram of the transfer characteristic of this portion of the circuit. Here, as was the case with FIG. 1, on logarithmic scales there is plotted gain as the ordinate and frequency as the abscissa. The several curves shown all demonstrate a similar appearance of having a pronouced slope to a point after which the gain remains at unity with further increases in frequency. The several lines illustrated as a through d are, respectively, for correspondingly smaller effective values of the resistance of the potentiometer 46 and demonstrate the achieved desired feature of providing an extremely high gain at low frequencies and a substantially uniform gain of unity at higher frequencies.

Referencing now the current limit circuit of the system of the present invention, it may be seen that so long as the value of the signal on line 18 (proportional to the motor current) as scaled by resistor 56 is less than the current limit reference from the potentiometer 50 as scaled by resistor 52, the operational amplifier 54 will be in positive saturation insuring that the diode 62 is back-biased. When, however, a scaled value of the signal on line 18 exceeds the scaled value of the reference signal from potentiometer 50, amplifier 54 will shift negative a sufficient amount to forward bias diode 62 allowing it to conduct and permitting a current to flow through resistor 38. This, in turn, will cause the potential at junction 64 and hence the value of the voltage on line 40 to the input of the amplifier 42 to be equal to the voltage at the output of the operational amplifier 54 (plus the relatively small amount of the voltage drop across the diode 62). This input to amplifier 42 will result in an immediate reduction in its output which when applied to the control power supply 22 by way of line 26 results in a reduction of the motor voltage and hence a reduction in motor current. It is thus seen that because of this action the two circuits, that is the current limit circuit and the speed control circuit, are substantially independent one of the other.

While there has been shown and described what is at present considered to be the preferred embodiment of the invention, modifications thereto will readily occur to those skilled in the art such as the provision of the speed feedback signal previously mentioned. It should also be noted that the current limit circuit shown is exemplary, the requirement being only that it be a threshold type of device such that it comes into operation only when the maximum permissible motor current is exceeded. It is, therefore, desired that the claims concluding this specification not be limited to the specific embodiment shown but they be interpreted in the true spirit and scope of the invention.

What is claimed is:

1. A regulator for a direct current motor, energized from a controllable power supply, responsive to motor current and motor speed feedback signals comprising:
  a. a current limit circuit including,
    1. means to provide a current reference signal proportional to a desired maximum motor current,
    2. means to compare said current reference signal with the motor current feedback signal to provide, when the latter exceeds the former, a current limit signal;
  b. a speed control circuit for providing a control signal to said power supply including,
    1. means to provide a speed reference signal proportional to a desired motor speed,
    2. means to compare said speed reference signal with the speed feedback signal to provide said control signal to control said power source in the absence of said current limit signal, said latter means including a resistive component (R) and a capacitive component (C) and having a transfer characteristic (G) defined by the equation $$G = \frac{1+R \cdot C \cdot j\omega}{R \cdot C \cdot j\omega};$$

and,
  c. means to interconnect the current limit circuit and the speed control circuit to produce the control signal as a function of said current limit signal when it is present.

2. The invention in accordance with claim 1 wherein said speed control circuit includes an operational amplifier, a capacitor connected between an output and an input of said amplifier, and a resistor connected between said amplifier input and a point of fixed potential.

3. The invention in accordance with claim 2 wherein said resistor is variable.

4. The invention in accordance with claim 1 wherein the means to interconnect includes a diode whereby signals of only one relative polarity from the current limit circuit may serve to produce the control signal.

5. A regulator responsive to feedback signals derived from a direct current motor and proportional to the motor current and motor speed comprising:
  a. a controllable power supply for varying the power applied to the motor in response to a control signal applied thereto;
  b. a current limit circuit including,
    1. means to provide a current reference signal indicative of a desired maximum motor current,
    2. means to compare said current reference signal with the motor current feedback signal to provide, when the latter exceeds the former, a current limit signal, said means to compare including a first operational amplifier having an integrating feedback circuit connected between its output and its input;
  c. a speed control circuit for providing said control signal to the controllable power supply including,
    1. means to provide a speed reference signal indicative of a desired motor speed,
    2. means to combine said speed reference signal with the motor speed feedback signal to develop an error signal indicative of the deviation in actual motor speed from that desired,
    3. means including a second operational amplifier responsive to said error signal, in the absence of said current limit signal, to develop said control signal, said latter means further including a capacitor (C) in parallel with said second amplifier and a resistor (R) connected between a point of fixed potential and said amplifier whereby said latter means has a transfer characteristic (G) defined by the equation:

$$G = \frac{1+R \cdot C \cdot j\omega}{R \cdot C \cdot j\omega};$$

and, d. means to interconnect said current limit circuit and said speed control circuit to provide said control signal as a function of said current limit signal during its occurrence.

6. The invention in accordance with claim 5 wherein said resistor is variable.

7. The invention in accordance with claim 6 wherein the variable resistor constitutes the sole adjustment of the speed control circuit.

8. The invention in accordance with claim 5 wherein the error and current limit signals are voltage signals and wherein the means to interconnect includes a diode poled to permit current limit signals of only one polarity to be effective to produce said control signal.

* * * * *